United States Patent [19]

Held

[11] 4,438,360
[45] Mar. 20, 1984

[54] DRIVING DEVICE FOR EFFECTING LINEAR MOTION

[76] Inventor: Kurt Held, Alte Str. 1, D-7728 Trossingen 2, Fed. Rep. of Germany

[21] Appl. No.: 366,138

[22] Filed: Apr. 7, 1982

[30] Foreign Application Priority Data

Apr. 10, 1981 [DE] Fed. Rep. of Germany ....... 3114591

[51] Int. Cl.³ .............................................. H02K 7/06
[52] U.S. Cl. ...................................... 310/83; 310/266
[58] Field of Search ........................... 310/80, 83, 266

[56] References Cited

U.S. PATENT DOCUMENTS

| | | | |
|---|---|---|---|
| 2,959,041 | 11/1960 | Scheller et al. | 310/266 X |
| 2,978,621 | 4/1961 | Martinek | 310/83 X |
| 3,441,761 | 4/1969 | Painton et al. | 310/266 X |
| 4,201,935 | 5/1980 | Fukuma et al. | |
| 4,277,706 | 7/1981 | Isaacson | 310/83 X |

FOREIGN PATENT DOCUMENTS 2743908 4/1979 Fed. Rep. of Germany .

OTHER PUBLICATIONS

Glückauf (1954), p. 852.

*Primary Examiner*—Donovan F. Duggan
*Attorney, Agent, or Firm*—Toren, McGeady and Stanger

[57] ABSTRACT

An electrically operated driving device includes a bell type armature motor with a hollow shaft containing an internal thread. An axially extending threaded spindle is located within and in threaded engagement with the shaft. The rotation of the hollow shaft is transformed into liner motion effected by the spindle. The movement of the threaded spindle relative to the hollow shaft can afford a different speed and/or a different direction of rotation. The armature is of the iron-free or ironless type. The device operates at the least weight almost inertialess, and converts the produced power without significant friction losses and it can be used in a very limited space.

1 Claim, 1 Drawing Figure

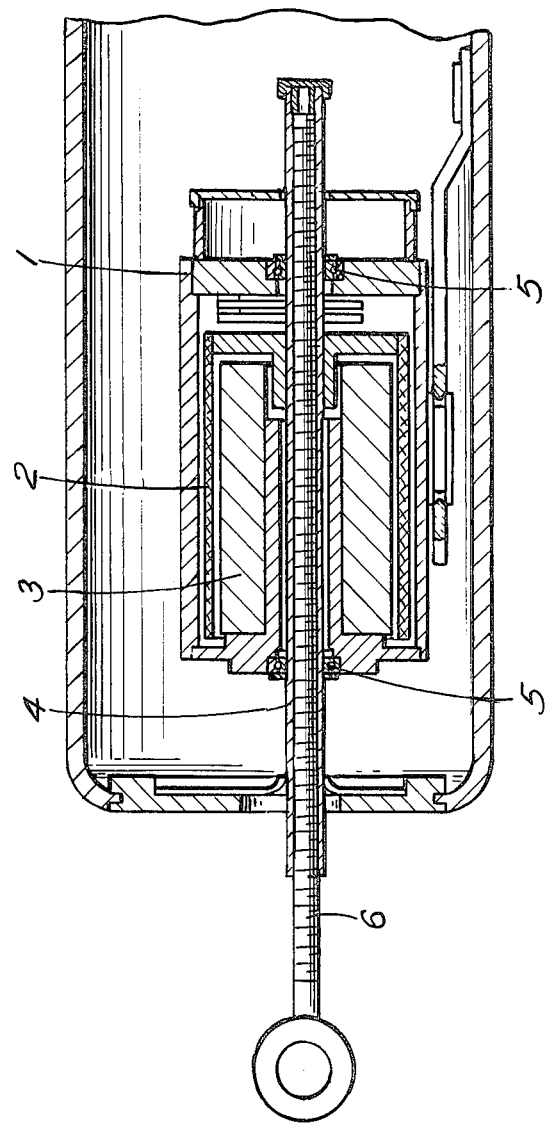

DRIVING DEVICE FOR EFFECTING LINEAR MOTION

SUMMARY OF THE INVENTION

The present invention is directed to a driving device for effecting linear motion using an electric motor, such as a bell-type armature motor having an axially extending hollow armature shaft.

Pneumatically or hydraulically operated thrust units or tension units can be employed to effect linear motion. Such units are suitable only to a limited extent in small devices and they are very complicated because the appropriate compressed medium, such as compressed air or compressed liquid, must be available for operation. For some time linear drives have been commercially available with a driving rod located within a cylinder-shaped housing so that the rod can be moved back and forth in the axial direction by a small electric motor via a worm gear drive or a bevel gear drive and a threaded rod, or by roller heads arranged obliquely with respect to the axial direction of the driving rod, note the brochure of Magnetic Elektromotoren GmbH in Maulburg, West Germany. It is also possible to connect the armature shaft of the driving motor directly in the axial direction by means of a threaded rod to a driving rod. Commercially available small motors, directcurrent servomotors and the like can be used as the driving source.

The known linear drives, however, have significant disadvantages, they are complicated in operation and operate with delays because the driving power of the motor shaft is transmitted by gear wheels, roller heads or the like and result in increased friction losses. Roller heads permit slippage and, therefore, are not suitable for the production of exactly reproducible motions with a fixed angle of rotation/distance ratio. Furthermore, the electric motors that have been used have such a large moment of inertia that the starting behavior is unfavorably affected and the ratio of weight to output is unsatisfactory.

Therefore, it is the primary object of the present invention to provide an electrically operated driving device for effecting linear motion which has a considerable output at an extremely low weight, it needs only a very limited starting voltage due to its small moment of intertia, and consequently it has a very high degree of efficiency and a fixed ratio of angle of rotation to linear distance.

In accordance with the present invention, an axially elongated threaded spindle is fitted within and in threaded engagement with the internal thread in an axially extending hollow armature shaft of a bell-type armature motor. The spindle is axially displaceable relative to the hollow armature shaft.

By the combination of an electric motor with a non-ferrous, bell-type armature and with a hollow armature shaft with an internal thread in engagement with a threaded spindle located within the hollow shaft, a driving device for effecting linear motion is afforded which has a minimum weight and operates almost without inertia. This driving device can be used where space conditions are limited and where it is important to convert the produced motor power into linear motion without large friction losses and slippage.

The drawing is an axial sectional view of a driving device embodying the present invention.

DETAIL DESCRIPTION OF THE INVENTION

In the drawing an armature 2 of an electric motor is shown within a housing 1. The armature 2 has a permanent magnet 3. The armature rotates on ball bearings 5 and has an axially extending hollow shaft 4 with an internal thread. An axially elongated threaded spindle 6 extends through and is in threaded engagement with the hollow shaft 4. During rotation of the hollow shaft, depending on the rotational direction, a force is transmitted in the axial direction either to the left or to the right as viewed in the drawing so that the rotational movement of the motor is converted into a linear motion of the spindle 6 in the shortest distance. The armature is of the non-ferrous type.

While specific embodiments of the invention have been shown and described in detail to illustrate the application of the inventive principles, it will be understood that the invention may be embodied otherwise without departing from such principles.

I claim:
1. An electrically operated driving device for effecting linear motion using an electric motor, comprising a non-ferrous bell-type armature having an axially extending hollow armature shaft with an internal thread, an elongated threaded spindle extending through and in threaded engagement with said hollow shaft and said threaded spindle being axially displaceable relative to said hollow armature shaft when said shaft is rotated.

* * * * *